UNITED STATES PATENT OFFICE.

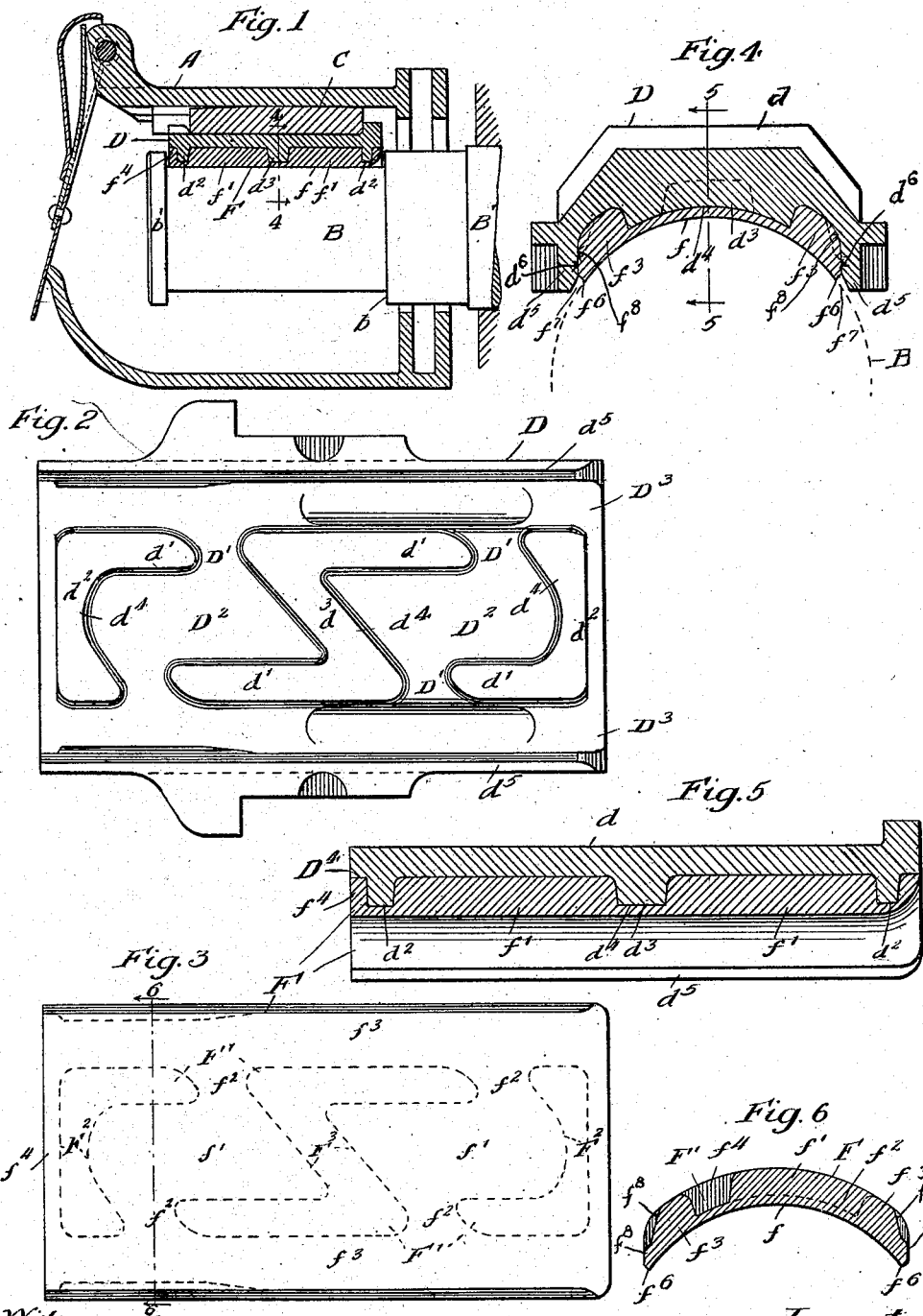

WILLIAM H. MINER, OF CHICAGO, ILLINOIS, AND JOHN E. MUHLFELD, OF BALTIMORE, MARYLAND; SAID MUHLFELD ASSIGNOR TO SAID MINER.

JOURNAL-BEARING FOR CAR AND OTHER AXLES.

No. 905,088.                 Specification of Letters Patent.               Patented Nov. 24, 1908.

Application filed October 31, 1907. Serial No. 399,980.

*To all whom it may concern:*

Be it known that we, WILLIAM H. MINER, a citizen of the United States, residing in Chicago, in the county of Cook and State of Illinois, and JOHN E. MUHLFELD, a citizen of the United States, residing in Baltimore, in the State of Maryland, have invented a new and useful Improvement in Journal-Bearings for Car and other Axles, of which the following is a specification.

Our invention relates to journal bearings for car and other axles.

Heretofore car axle journal bearings of the kind most commonly in use have ordinarily consisted of a solid one piece composite body composed of a main shell of hard, strong bearing metal, ordinarily brass, having a concave bearing face and a thin soft metal lining of antimonial lead, Babbitt or other suitable bearing metal soldered or fusibly united to the brass shell throughout the contacting faces of the two metals to anchor the soft metal lining to the main shell at every part of its surface or area, the softness of the lining enabling its concave bearing face to conform to the shape of the particular journal to which the bearing is applied, whether such journal be a new one or an old one and more or less worn out of or from its true or normal shape. As the lining metal should necessarily be sufficiently soft to enable its concave bearing face to quickly conform to the contour of the journal to which the bearing is applied, (as a heated journal would otherwise speedily result,) the soft metal lining is also necessarily quite thin, ordinarily from one sixteenth to one eighth of an inch in thickness, because if made much to exceed this thickness, the soft metal will squeeze, flow, crawl or roll out transversely under the pressure and rolling action of the journal or be forced out longitudinally under pressure of the load or by the end thrust of the journal collars. The soft lining being thus necessarily thin, it requires frequent replacement, which can only be done by removing the main or brass shell and remolding a new soft metal lining into it; and frequently the soft metal lining becomes either entirely worn away, or else melted out from a heated journal, so that the brass bearing shell itself also becomes so worn, either at its concave bearing surface or at its ends from contact with the journal collars or shoulders as to be unfit for further use, and thus requires to be scrapped and replaced by a new brass shell at great expense. In actual practice, however thin the soft metal lining may originally be, its destruction and lack of durability is ordinarily as much due to the squeezing or flowing out of the soft metal of the lining under the rolling action of the journal and the end thrust pressure of the journal collars as it is to actual wear, notwithstanding the fact that the lining throughout its entire surface or area is soldered or fusibly united with the main or brass shell at every part, and constitutes therewith one single solid integral piece or body.

The object of our invention is to provide an improved construction of journal bearing comprising two separate and independent bearing metal shells, one, an outer or main shell of hard, strong bearing metal, preferably brass, and the other, an inner or lining shell of a soft bearing metal, as antimonial lead or babbitt, in which the lining shell will be removable from the main shell and in which the lining shell will be securely and adequately anchored at every part to the main shell against displacement either longitudinally under the end thrust of the journal collars or shoulders, or transversely under the rolling action of the journal, and this without the necessity of soldering or fusibly uniting the two shells together, and in which, at the same time, the soft metal of the lining shell may be effectually prevented from squeezing, flowing or rolling out under pressure of the journal and its collars or shoulders due either to the rolling action of the journal or the end thrust or play of the journal so that the removable lining shell will be efficient and durable and at the same time easily and conveniently removable or replaceable, and in which further, the main shell as well as the lining shell will have full and adequate bearing face area for contact with the journal in case the lining shell should become entirely worn away or melt and flow out by reason of a heated journal.

Our invention consists in the means we employ to practically accomplish these objects or results in a single unitary structure: That is to say, it consists in a journal bearing comprising in combination a main shell of hard, strong bearing metal, preferably brass, furnished on its lower face with a plurality of comparatively narrow bearing ribs located under and within the upper key contact face of said main shell and extending in part longitudinally and in part transversely or diagonally, and having concave faces of adequate aggregate area to constitute an effective bearing for the journal in the absence of any lining, and also having on its lower face a network of connecting channels, cavities or depressions surrounding and between said bearing ribs, of comparatively large area in the aggregate, and an independent and separate piece removable lining shell of soft bearing metal fitting and confined at its longitudinal side edges between and by the depending marginal side walls of the main shell, and having a concave lower face for bearing contact with the journal adapted to quickly conform to the journal contour, said removable lining shell having a thin or channel portion of relatively small area to receive the bearing ribs of the main shell, and marginal side and end and intermediate ribs or thickened portions of relatively large area fitting in the marginal side and end channels and central depressions of the main shell, said ribs, projections or thickened portions of the soft metal shell interfitting and abutting with the bearing ribs and marginal longitudinal sides of the main shell, said interfitting ribs and projections on the meeting faces of the two shells having substantially upright but slightly flaring abutment faces or walls and extending in part transversely and in part longitudinally and presenting numerous abutment faces of aggregate extensive area to prevent both longitudinal and lateral displacement of the soft metal shell under the rolling action of the journal or the end thrust of its collars. The longitudinal ribs at the outer edges of the separate piece soft metal removable lining shell afford extended abutment faces for the lining shell at its side edges against the coöperating abutment faces of the main shell formed by its depending side walls, and in connection with the coöperating longitudinal abutment faces of the bearing ribs on the main shell and the corresponding interfitting parts of the lining shell effectually anchors the lining shell against transverse displacement due to the rolling action of the journal. And these numerous longitudinally extending abutment faces on the two shells also effectually prevent the soft metal of the lining shell from squeezing, flowing or crawling out transversely under the rolling action of the journal. In like manner also the transversely extending interfitting abutment faces of the two shells effectually anchor the lining shell from displacement longitudinally under the end thrust of the journal collars or shoulders. And the marginal transverse rib at the extreme end of the soft metal shell abutting at its inner face directly against the outer face of the transversely extending end bearing rib of the main shell serves not only to relieve the brass shell from the wear of the journal collar, but also causes the end bearing rib of the main shell to present an effective resistance to longitudinal displacement of the lining shell under end thrust of the journal collar. The marginal side and end ribs on the upper face of the soft metal lining shell are integrally connected with the intermediate or central thickened portions of said lining shell by short connecting ribs, and constitute a connected network of ribs and thickened portions which remain in one integral network after the thin or channel portions of the lining shell are worn entirely away so that even after the lining shell has become so worn that the journal contacts with the bearing ribs of the main shell no part of the removable lining shell can drop out or become displaced, notwithstanding the fact that no part of the lining shell is soldered or fusibly united with the main shell.

In our invention, the connected network of ribs or thickened portions on the upper face of the soft metal lining shell in coöperation with the interfitting bearing ribs and abutment faces of the main shell performs a double or two-fold function in serving first to effectually anchor the lining shell and main shell together against longitudinal or transverse displacement under the rolling action of the journal or under end thrust of its collars, thus entirely dispensing with the necessity of soldering or fusibly uniting the two shells into one single solid body, and second, in serving to prevent the squeezing, flowing or crawling of the soft metal of the lining under the rolling action of the journal. To effectually accomplish both of these functions, it is necessary that the inner or abutment faces of the marginal side walls of the main shell should extend substantially upright; that is to say, at a large angle to the adjacent concave surface of the lining shell or periphery of the journal, and that the lining shell should have marginal longitudinally extending ribs at its outer side edges so as to have and present an extended and adequate abutment face against the side wall abutment face of the main shell and thereby at once anchor the lining shell against lateral displacement under the rolling action of the journal and also prevent the squeezing or flowing of the soft metal in the lining shell under such rolling action. And to effectually accomplish both of these functions, it is also necessary that the main shell should have shouldered ends, (that is to say have at each of its extreme outer ends a transversely extending recess or channel and a transversely extending bearing rib to afford a transverse abutment face), and that the soft metal lining shell should have at its extreme outer ends transversely extending marginal ribs to take the end thrust and wear of the journal collars or shoulders. In our invention also, the interfitting network of ribs and thickened portions, being distributed over the meeting faces of the two shells, effectually anchor the two shells against lateral or longitudinal displacement throughout their entire contacting surfaces or areas so that even if the inner or lining shell were sawed up longitudinally and transversely into a large number of comparatively small blocks, all such small blocks would be individually and separately anchored against movement on the main shell either longitudinally or transversely. And it is in part this interfitting rib construction of the two shells, extending throughout their entire contacting faces which enables us to make the lining separate and removable from the main shell and entirely dispense with the old soldering or fusible union thereof, while at the same time effecting a very secure anchorage of the lining shell to the main shell. In our invention it will be seen that before the lining shell could give or be displaced longitudinally under the end thrust of the collars, it would be necessary for the bearing ribs on the main shell to shear through not only the transversely extending marginal end ribs of the lining shell but also through the large intermediate or central projections of the lining shell and the connecting ribs which join these central projections or thickened portions to the longitudinal side ribs, and so in like manner in our invention before the lining shell can be displaced transversely under the rolling action of the journal, it would be necessary for the longitudinal bearing ribs of the main shell to shear through the large central projections or thickened portions of the lining shell as well as to force or flow the soft metal of the lining shell through the narrow contracted space between the journal and the lower edge of the side wall of the main shell.

A further feature of our invention consists in providing the main shell with a transversely extending diagonal bearing rib connecting the two longitudinal bearing ribs, and so inclined that no transverse plane at right angles to the journal axis through such diagonal bearing rib will fail to intersect one or both edges of such diagonal bearing rib so that any grit or foreign substance that may get between the journal and the bearing rib of the main shell may embed itself in the intervening soft metal of the lining shell and not have to cut its way entirely through the hard metal of the main shell before it can escape. A further feature of our invention consists in the soft metal lining shell having ribbed or thickened side edges which terminate short of the lower edges of the depending side walls of the main shell to form a channel way between the sides of the main shell and the lower edges of the lining shell to permit of the oil from the journal packing better finding its way by capillarity and by the revolving and frictional action of the journal between the bearing face of the lining shell and the journal.

Our invention also consists in the novel construction of parts and devices and in the novel combinations of parts and devices herein shown and described.

In the accompanying drawing forming a part of this specification, Figure 1 is a central vertical longitudinal section of a journal bearing embodying our invention. Fig. 2 is a detail bottom view of the main bearing metal shell. Fig. 3 is a detail plan view of the inner soft metal lining or auxiliary metal shell. Fig. 4 is a cross section on line 4—4 of Fig. 1. Fig. 5 is a detail longitudinal section on line 5—5 of Fig. 4 and Fig. 6 is a cross section on line 6—6 of Fig. 3.

In the drawing, A represents the journal box, B the journal, $B^1$ the car or other axle, $b$ and $b^1$ the inner and outer collars or shoulders at the ends of the journal, and C the journal bearing key or wedge, all these parts being of the standard Master Car Builders' type or construction.

D, F is our improved construction of journal bearing, it also being of standard Master Car Builders' interchangeable form, and comprising two separable or removable imperforate bearing metal shells, the main portion D being preferably of brass, or other hard strong and efficient bearing metal or composition of metals in one solid integral mass, and the inner lining or auxiliary portion F being of a soft bearing metal, as babbitt or other suitable composition of metals, and also in one solid integral mass. The two portions or shells D and F are made separable or removable one from the other so that the inner or soft metal portion F may be removed and replaced when worn or injured by another like soft metal shell. The main bearing metal shell D has an upper face $d$ suitable for contacting or connecting with the journal box A or interposed key or wedge C, this upper face D being preferably flat or of other suitable shape according to the particular contacting or connecting means employed for connecting the journal bearing with the journal box and holding it in proper relation with the journal.

The main bearing metal shell D of the journal is provided on its inner or bearing face with integral longitudinal bearing ribs $d^1$ and integral end bearing ribs $d^2$ and an intermediate diagonally and transversely extending connecting bearing rib $d^3$, all having curved bearing faces $d^4$ corresponding to the curvature of the journal. The longitudinal bearing ribs $d^1$ have connecting channels $D^1$ through the same, staggered or breaking joints in respect to each other; and the longitudinal bearing ribs $d^1$ are integrally connected by the intermediate transverse diagonal bearing rib $d^3$ and by the end bearing ribs $d^2$. The connecting channels $D^1$ through the longitudinal bearing ribs $d^1$ connect the central longitudinal recesses or cavities $D^2$ with the longitudinal side cavities or recesses $D^3$ of the main bearing shell. At its extreme outer end the main bearing shell D is also provided with transverse recesses $D^4$ to receive corresponding transverse ribs on the soft metal lining or auxiliary shell F. The main bearing metal shell D also has longitudinal marginal ribs or sides $d^5$ to confine the soft metal lining or auxiliary shell F and give strength to the journal bearing as a whole. These marginal longitudinal ribs or sides $d^5$ are not bearing members and are not designed to come in contact with the journal of the axle.

The longitudinal marginal side walls $d^5$ of the main shell D have substantially upright but slightly flaring abutment faces $d^6$ which engage the corresponding abutment faces $f^8$ of the ribbed or thickened outer side edges of the lining shell F to securely anchor the removable lining shell to the main shell against lateral or transverse displacement under the rolling action of the journal and also to prevent the soft metal of the lining shell from squeezing, crawling or flowing out under the rolling action of the journal. The slightly flaring shape of these abutment faces $d^6$ and $f^8$ on the side walls of the two shells enables the lining shell to be readily removed and replaced while not materially lessening their confining action. As in our invention the two shells D and F are in two separate pieces, and the one removable from the other, when the lining shell becomes so worn away that the journal contacts with the bearing ribs of the lining shell, oil, water or other lubricating or cooling liquid in the journal box packing drawn up by capillary action between the two shells, may pass down through openings worn in the lining shell onto the journal, and thus materially aid in lubricating and cooling the same, and thereby prevent injurious cutting and heating, and enable the car to reach its destination in safety.

The soft metal lining or filling shell F of the journal bearing is in one integral mass and is separable and removable from the main shell D and is provided on its upper or main-shell-contacting face with interfitting lugs, ribs, projections and recesses or cavities corresponding to those on the lower face of the main shell and interfitting therewith. The lower face $f$ of the soft metal lining or bearing shell F is curved to conform to the curvature of the journal. The shell F is furnished with central projections, lugs or thickened portions $f^1$ fitting in the central cavities $D^2$ of the main shell D, ribs $f^2$ fitting in the connecting channels $D^1$ of the shell D and longitudinal ribs or thickened portions $f^3$ fitting in the longitudinal side cavities $D^3$ of the main shell D and with a transverse rib $f^4$ at its extreme end fitting in the transversely extending end recesses $D^4$ of the main shell D and with channels, recesses or cavities $F^1$ $F^2$ $F^3$ to receive the corresponding bearing ribs $d^1$ $d^2$ $d^3$ of the main shell D.

The longitudinal marginal ribs or sides $d^5$ of the main shell D extend beyond the extreme side edges $f^6$ of the soft metal shell F so as to leave an open longitudinal space or channel $f^7$ in the bearing as a whole, at each side, to give better access to the oil waste or packing for more efficient lubrication of the journal and its bearing.

Our composite journal bearing thus consists of two separable parts or shells, each in one integral mass, and each of an efficient bearing metal, one of hard bearing metal, which under normal conditions acts simply to give the requisite strength to the bearing as a whole, and as the holder or container for the other or soft bearing metal shell, which latter, under normal conditions, takes all the wear due to pressure on the axle journal or on account of impact or rolling, sliding, end play or lateral motion friction; while at the same time the main or hard bearing metal shell has by reason of its longitudinal and transverse bearing ribs, an adequate bearing surface for contact with the journal and operates as an efficient bearing in case the soft metal portion of the bearing should heat, melt and flow out or become too much worn away.

While certain features of our invention may be practiced by employing a main or hard bearing metal shell in connection with an inner or soft bearing metal shell which is soldered or fusibly united to the main or hard metal shell so that the soft metal shell cannot be removed, I prefer to make the two shells separate and removable from each other so that the soft metal shell may at any time be removed and replaced by simply taking the old or worn one out and putting a new one in its place. To facilitate the removal and proper interfitting of the main or hard bearing metal shell or lining, the interengaging ribs and projections or channels and recesses of the two shells are made slightly tapering, preferably about as indicated in the drawing. The tapering faces of the interfitting or interengaging projecting parts of the two shells also serve to cause the soft metal shell, under pressure of the journal box and weight of the car, to snugly fit in close metal to metal contact with the main or hard metal shell so that the two shells operate efficiently the same as though the inner shell were in fact soldered, fused or otherwise rigidly and irremovably connected with the main or outer shell.

In our invention the main shell D is materially strengthened by the raised transverse end bearing ribs $d^2$, longitudinal bearing ribs $d^1$ and transversely extending intermediate diagonal bearing rib $d^3$ which connects the middle portion of the longitudinal bearing ribs $d^1$ $d^1$, and which ribs in effect double the thickness of the main shell at the bearing rib portion thereof, directly under the upper key contact face of the main shell which takes the load of the journal box. These transverse bearing ribs $d^2$ $d^3$ not only strengthen the main shell, but also afford numerous transverse abutment faces, having in the aggregate an extensive abutment area, against the corresponding interfitting transverse abutment faces of the thickened portions $f^1$ and ribs $f^4$ of the soft metal lining shell F to resist the end thrust of the journal collars or flanges $b$, $b^1$ and thus effectually prevent endwise displacement of the soft metal lining under end play of the car axle or journal. The longitudinal bearing ribs $d^1$ of the main shell in connection with the diagonally extending intermediate cross bearing rib $d^3$ and the marginal confining sides $d^5$ also serve not only to strengthen the main shell against transverse fracture, but also to afford numerous longitudinal abutment faces, of an aggregate extensive area, against the coöperating and corresponding longitudinal abutment faces of the thickened portions $f^1$ and longitudinal marginal ribs $f^3$ of the soft metal lining shell F to resist the tendency of the lining shell under the rolling action of the journal to thin or crawl transversely out from its position between the journal and the main shell. And so too in like manner the thick marginal end ribs $f^4$ and marginal side ribs $f^3$, which surround the large central thick portions $f^1$ $f^1$, and which are integrally joined with said central portions or projections $f^1$ $f^1$ by the short connecting ribs $f^3$ serve, in addition to affording transverse and longitudinal abutment faces against the corresponding abutment faces of the bearing ribs $d^1$ $d^2$ and $d^3$ of the main shell, also to stiffen and strengthen the soft metal lining shell, and thus to cause said lining shell itself to materially strengthen the main shell with which it interfits. In our invention each shell, both the main or brass shell and the soft metal lining shell, have not only channels or cavities to receive ribs or thickened portions on the other shell, but also ribs or thickened portions which themselves fit in corresponding channels or cavities in such other shell; and this is an essential feature, not only to properly strengthen and stiffen each and both shells without excessive weight of metal in either, but also to give the necessary transverse and longitudinal abutment face areas between the two shells to prevent longitudinal or lateral displacement or crawling of the soft metal shell under the rotating or rolling like action of the journal and end thrust of the collars thereof against the soft metal lining due to side play or side thrust of the axle when the train rounds curves. In the soft metal lining shell F all the ribs or thickened portions $f^1$ $f^2$ $f^3$ and $f^4$ integrally connect and join with each other in a continuous net work; but in the brass or main shell D the continuity of the bearing ribs $d^1$ $d^2$ and $d^3$ is necessarily broken or interrupted by the transverse connecting channels $D^1$ through the longitudinal bearing ribs $d^1$, which enable the soft metal lining in case of its heating and melting to flow out, and the air to circulate between the main or brass shell D and the journal, and also the lubricant to have ready access thereto, as well as also water, when that is applied for cooling. In the main or brass shell F the diagonal bearing rib $d^3$ integrally connecting the middle portions of the two longitudinal bearing ribs $d^1$ $d^1$ forms therewith a continuous Z-shaped bearing rib; and the end bearing rib $d^2$ connecting integrally with the shorter portions of the longitudinal bearing ribs $d^1$, form therewith an L-shaped continuous rib.

We claim:—

1. A journal bearing comprising in combination a main shell of hard, strong bearing metal provided on its under face at its crown portion with longitudinal bearing ribs, transversely extending end bearing ribs and an intermediate diagonally extending bearing rib on its under face, and with central cavities, said longitudinal bearing ribs being one on each side of the central line of said main shell, longitudinal side channels and connecting channels between said central cavities and said longitudinal side channels and a soft metal lining shell, having on its upper face marginal end and side ribs and central thickened portions fitting in said channels and cavities of the main shell, said diagonal bearing rib on the main shell being inclined at such angle as to cause all transverse planes through it to intersect one or the other or both of its edges, substantially as specified.

2. A journal bearing comprising in combination a main shell of hard, strong bearing metal, provided on its under face at its crown portion with longitudinally extending bearing ribs, one on each side of its central line transversely extending end bearing ribs and an intermediate diagonally extending bearing rib inclined at such angle as to cause all transverse planes at right angles to the journal axis to cut one or the other or both of its edges, and a soft metal lining shell having on its upper face, channels to receive said bearing ribs of the main shell, substantially as specified.

3. A journal bearing comprising in combination a main shell of hard, strong bearing metal having depending side walls, and provided on its under face with longitudinally extending bearing ribs, transversely extending end bearing ribs and an intermediate transversely and diagonally extending bearing rib and having longitudinally extending side channels between said side walls and said longitudinal bearing ribs, and central cavities or depressions between said longitudinal, end and diagonal bearing ribs, said main shell having also shouldered ends formed by transversely extending channels at its extreme ends, and a separate piece removable soft metal lining shell having ribbed or thickened side edges embraced between and confined by the depending side walls of the main shell, and provided on its upper face with transversely extending ribs at its extreme ends and central thickened portions intervening with said bearing ribs on the main shell, the depending side walls and bearing ribs of the main shell and the interfitting marginal side and end ribs of the soft metal shell presenting numerous abutment faces of aggregate extensive area to prevent longitudinal and lateral displacement of the soft metal shell throughout all parts of its area, and also serving to prevent the soft metal lining from squeezing or flowing out under the rolling action of the journal, substantially as specified.

4. A journal bearing comprising in combination a main shell of hard, strong bearing metal, provided with depending side walls having interior abutment faces and recessed or channeled ends having exterior abutment faces and longitudinally extending bearing ribs, transversely extending end bearing ribs and an intermediate bearing rib, all said bearing ribs having abutment faces, and a separate piece removable soft metal lining shell provided with marginal longitudinally extending side ribs, transversely extending marginal end ribs and central projections or thickened portions, all said ribs and thickened portions of the lining shell having abutment faces interfitting with and abutting the corresponding abutment faces of the main shell and together presenting numerous abutment faces of aggregate extensive area to anchor the two shells together and prevent longitudinal and lateral displacement of the soft metal shell, substantially as specified.

5. A journal bearing comprising in combination a main shell of hard, strong bearing metal, provided with depending side walls having interior abutment faces and recessed or channeled ends having exterior abutment faces and longitudinally extending bearing ribs, transversely extending end bearing ribs and an intermediate bearing rib, all said bearing ribs having abutment faces, and a separate piece removable soft metal lining shell provided with marginal longitudinally extending side ribs, transversely extending marginal end ribs and central projections or thickened portions, all said ribs and thickened portions of the lining shell having abutment faces interfitting with and abutting the corresponding abutment faces of the main shell and together presenting numerous abutment faces of aggregate extensive area to anchor the two shells together and prevent longitudinal and lateral displacement of the soft metal shell, said main shell having connecting channels through said longitudinal bearing ribs and said soft metal shell having connecting ribs fitting therein and integrally connecting its marginal side ribs and central thickened portions, substantially as specified.

6. A journal bearing comprising in combination a main shell of hard, strong bearing metal having depending side walls with substantially upright but slightly flaring interior abutment faces and having on its lower face within or between said walls and lying under and within its upper key contact face, a plurality of relatively narrow bearing ribs extending in different directions, and a separate piece removable soft metal lining shell having thickened or ribbed marginal side edges fitting between and confined by said marginal side walls of the main shell, and having substantially upright exterior abutment faces, and provided on its upper face with projections or thickened portions fitting between and interfitting with said bearing ribs of the main shell, said main shell having transversely extending recesses at its extreme ends and said lining shell having transversely extending ribs at its extreme ends connecting with said marginal side ribs at the corners, substantially as specified.

7. A journal bearing comprising in combination a main shell of hard, strong bearing metal having depending side walls with substantially upright but slightly flaring interior abutment faces, and having on its lower face within or between said walls and lying under and within its upper key contact face, a plurality of relatively narrow bearing ribs extending in different directions, and a separate piece removable soft metal lining shell having thickened or ribbed marginal side edges fitting between and confined by said marginal side walls of the main shell and having substantially upright exterior abutment faces, and provided on its upper face with projections or thickened portions fitting between and interfitting with said bearing ribs of the main shell, said main shell having recessed ends and said lining shell having transversely extending ribs at its extreme ends to engage the journal collars, substantially as specified.

8. A journal bearing comprising in combination a main shell of hard, strong bearing metal having depending side walls with substantially upright but slightly flaring interior abutment faces, and having on its lower face within or between said walls and lying under and within its upper key contact face, a plurality of relatively narrow bearing ribs extending in different directions, and a separate piece removable soft metal lining shell having thickened or ribbed marginal side edges fitting between and confined by said marginal side walls of the main shell and having substantially upright exterior abutment faces, and provided on its upper face with projections or thickened portions fitting between and interfitting with said bearing ribs of the main shell, said main shell having recessed ends and said lining shell having transversely extending ribs at its extreme ends to engage the journal collars, said lining shell having connecting ribs extending between its central projections or thickened portions and its marginal side ribs, substantially as specified.

9. A journal bearing comprising in combination a main shell of hard, strong bearing metal having depending side walls with substantially upright but slightly flaring interior abutment faces, and provided with bearing ribs on its under face at its crown portion and a separate piece removable soft metal lining shell fitting within and between and confined by said depending side walls of the main shell and having at its outer side edges extended abutment faces to engage the side walls of the main shell to anchor the lining shell to the main shell and prevent its displacement transversely under the rolling action of the journal, said main shell having recessed ends and said lining shell having transversely extending ribs at its extreme ends, substantially as specified.

10. A journal bearing comprising in combination a main shell of hard, strong bearing metal having depending side walls with substantially upright but slightly flaring interior abutment faces, and a separate piece removable soft metal lining shell fitting within and between and confined by said depending side walls of the main shell and having at its outer side edges extended abutment faces to engage the side walls of the main shell to anchor the lining shell to the main shell and prevent its displacement transversely under the rolling action of the journal, said main shell being also provided between its depending side walls with a plurality of longitudinally extending bearing ribs having abutment faces, and said lining shell being also provided with a plurality of ribs or thickened portions having abutment faces engaging the abutment faces of said bearing ribs of the main shell to further anchor the lining shell to the main shell and prevent its being displaced transversely under the rolling action of the journal, said main shell having recessed ends and said lining shell having transversely extending ribs at its extreme ends, substantially as specified.

11. In a journal bearing, the combination with a main shell, having depending side walls with substantially upright but slightly flaring interior abutment faces and a separate piece removable soft metal lining shell provided with ribs at its marginal side edges, having extended abutment faces, and fitting between and confined by the marginal side walls of the main shell, said main shell being provided with recessed ends having abutment faces and said soft metal lining shell having at its ends transversely extending ribs fitting and abutting against the recessed ends of the main shell, said main shell being provided on its under face with a plurality of narrow bearing ribs and said soft metal lining shell having on its upper face channels to receive said bearing ribs of the main shell, said bearing ribs of the main shell extending in part longitudinally and in part transversely, and in part diagonally, substantially as specified.

12. In a journal bearing, the combination with a main shell having depending side walls with substantially upright but slightly flaring interior abutment faces, and a separate piece removable soft metal lining shell provided with ribs at its marginal side edges, having extended abutment faces, and fitting between and confined by the marginal side walls of the main shell, said main shell being provided with recessed ends having abutment faces, and said soft metal lining shell having at its ends transversely extending ribs fitting and abutting against the recessed ends of the main shell, said main shell being provided on its under face with a plurality of narrow bearing ribs, and said soft metal lining shell having on its upper face channels to receive said bearing ribs of the main shell, said bearing ribs of the main shell extending in part longitudinally and in part transversely and in part diagonally, and said main shell having connecting channels extending through its longitudinally extending bearing ribs, substantially as specified.

13. In a journal bearing, the combination with a main shell having depending side walls with substantially upright but slightly flaring interior abutment faces, and a separate piece removable soft metal lining shell provided with ribs at its marginal side edges, having extended abutment faces, and fitting between and confined by the marginal side walls of the main shell, said main shell being provided with recessed ends having abutment faces, and said soft metal lining shell having at its ends transversely extending ribs fitting and abutting against the recessed ends of the main shell, said main shell being provided on its under face with a plurality of narrow bearing ribs, and said soft metal lining shell having on its upper face channels to receive said bearing ribs of the main shell, said bearing ribs of the main shell extending in part longitudinally and in part transversely and in part diagonally, and said main shell having connecting channels extending through its longitudinally extending bearing ribs, said diagonally extending bearing rib of the main shell being inclined at such angle as to cause all transverse planes at right angles to the journal axis to intersect one or both of its diagonal edges, substantially as specified.

14. In a journal bearing, the combination with a main shell having depending side walls with substantially upright but slightly flaring interior abutment faces, and a separate piece removable soft metal lining shell provided with ribs at its marginal side edges, having extended abutment faces, and fitting between and confined by the marginal side walls of the main shell, said main shell being provided with recessed ends having abutment faces, and said soft metal lining shell having at its ends transversely extending ribs fitting and abutting against the recessed ends of the main shell, said main shell being provided on its under face with a plurality of narrow bearing ribs, and said soft metal lining shell having on its upper face channels to receive said bearing ribs of the main shell, said bearing ribs of the main shell extending in part longitudinally and in part transversely and in part diagonally, and said main shell having connecting channels extending through its longitudinally extending bearing ribs, the lower longitudinal edges of said soft metal lining shell terminating short of the lower edges of said depending side walls of the main shell, substantially as specified.

15. A journal bearing comprising a main shell of hard, strong bearing metal having longitudinally extending marginal side walls with interior substantially upright but slightly flaring abutment faces, and provided on its lower face at its crown portion with both longitudinally extending and transversely extending bearing ribs, and a separate piece removable soft metal lining shell fitting within and confined at its outer side edges by said marginal side walls of the main shell, and having on its upper face thickened portions interfitting with said bearing ribs on the main shell, and said outer side edges of said lining shell being ribbed or thickened, said main shell having recessed ends and said lining shell having transversely extending ribs at its extreme ends, substantially as specified.

16. A journal bearing comprising a main shell of hard, strong bearing metal, having longitudinally extending marginal side walls with interior substantially upright but slightly flaring abutment faces, and provided on its lower face at its crown portion with both longitudinally extending and transversely extending bearing ribs, and a separate piece removable soft metal lining shell fitting within and confined at its outer side edges by said marginal side walls of the main shell, and having on its upper face thickened portions interfitting with said bearing ribs on the main shell, said outer side edges of said lining shell being ribbed or thickened, said main shell having transversely extending recesses or channels at its extreme ends, and said lining shell having marginal transverse ribs at its extreme ends, substantially as specified.

17. A journal bearing comprising a main shell of hard, strong bearing metal having longitudinally extending marginal side walls with interior substantially upright but slightly flaring abutment faces, and provided on its lower face at its crown portion with both longitudinally extending and transversely extending bearing ribs and transversely extending channels at its extreme ends and a separate piece removable soft metal lining shell fitting within and confined at its outer side edges by said marginal side walls of the main shell, and having on its upper face thickened portions interfitting with said bearing ribs on the main shell, said outer side edges of said lining shell being ribbed or thickened, said main shell having connecting channels through its longitudinal bearing ribs and said lining shell having connecting ribs fitting in said connecting channels, said lining shell having transversely extending ribs at its extreme ends connecting at the corners with the marginal ribs or thickened edges of said lining shell, substantially as specified.

18. A journal bearing comprising a main shell of hard, strong bearing metal, having longitudinally extending marginal side walls with interior substantially upright but slightly flaring abutment faces, and provided on its lower face at its crown portion with both longitudinally extending and transversely extending bearing ribs, and a separate piece removable soft metal lining shell fitting within and confined at its outer side edges by said marginal side walls of the main shell, and having on its upper face thickened portions interfitting with said bearing ribs on the main shell, said outer side edges of said lining shell being ribbed or thickened, said main shell having transversely extending recesses or channels at its extreme ends, and said lining shell having marginal transverse ribs at its extreme ends, said main shell having connecting channels through its longitudinal bearing ribs and said lining shell having connecting ribs fitting in said connecting channels, substantially as specified.

19. A journal bearing comprising a main shell of hard, strong bearing metal, having longitudinally extending marginal walls with interior substantially upright but slightly flaring abutment faces, and provided on its lower face with both longitudinally extending and transversely extending bearing ribs, and a separate piece removable soft metal lining shell fitting within and confined at its outer side edges by said marginal side walls of the main shell, and having on its upper face thickened portions interfitting with said bearing ribs on the main shell, and said outer side edges of said lining shell being ribbed or thickened, said main shell having also a diagonally extending intermediate bearing rib connecting its longitudinal bearing ribs, said main shell having recessed ends and said lining shell having transversely extending ribs at its extreme ends connecting at the corners with the ribbed or thickened side edges of said lining shell, substantially as specified.

20. A journal bearing comprising in combination a main shell of hard, strong bearing metal having marginal side walls with substantially upright but slightly flaring interior abutment faces, and provided on its under face at its crown portion with a plurality of bearing ribs spaced apart and extending in part at angles to each other, and a separate piece removable soft metal lining shell having thick outer side edges fitting within and confined by said marginal side walls of the main shell and having channels to receive the bearing ribs of the main shell and interfitting thick portions to anchor the removable lining shell to the main shell against longitudinal or transverse displacement, said main shell having recessed ends and said lining shell having transversely extending ribs at its extreme ends connecting at the corners with the ribbed or thickened side edges of said lining shell, substantially as specified.

21. A journal bearing comprising in combination a main shell of hard, strong bearing metal having marginal side walls with substantially upright, but slightly flaring interior abutment faces, and provided on its under face at its crown portion with a plurality of bearing ribs spaced apart and extending in part at angles to each other and a separate piece removable soft metal lining shell having thick outer side edges fitting within and confined by said marginal side walls of the main shell, and having channels to receive the bearing ribs of the main shell and interfitting thick portions to anchor the removable lining shell to the main shell against longitudinal or transverse displacement, said main shell being provided with recessed ends having transversely extending abutment faces, and said soft metal lining shell having at its ends transversely extending ribs abutting against the recessed ends of said main shell for contacting with the journal collar, substantially as specified.

22. A journal bearing comprising in combination a main shell of hard, strong bearing metal provided with a plurality of narrow connected bearing ribs on its under face at its crown portion and a removable soft metal lining shell, said main shell having depending longitudinally extending marginal side walls with substantially upright but slightly flaring abutment faces embracing and confining said soft metal lining shell at its outer side edges against transverse displacement under the rolling action of the journal, said soft metal lining shell being provided with upwardly projecting longitudinally extending ribs at its outer side edges having substantially upright but slightly flaring external abutment faces, said main shell having recessed ends and said soft metal lining shell having transversely extending ribs at its extreme ends abutting against the recessed ends of the main shell, substantially as specified.

23. In a journal bearing, the combination with the main bearing metal shell having longitudinally and transversely extending bearing ribs on its curved face at its crown portion and provided with depending sides having substantially upright but slightly flaring sides, and said main shell having tranverse recesses at its extreme ends, of a removable soft metal lining shell having on its back marginal side and marginal end ribs and central projections or thickened portions, substantially as specified.

24. In a journal bearing, the combination with the main bearing metal shell having longitudinally and transversely extending bearing ribs on its curved face at its crown portion and provided with depending sides having substantially upright but slightly flaring sides, and said main shell having transverse recesses at its extreme ends of a removable soft metal lining shell having on its back marginal side and marginal end ribs and central projections or thickened portions, said soft metal lining shell having also connecting ribs extending between said central thickened portions and said marginal side ribs, substantially as specified.

25. In a journal bearing, the combination with the main bearing metal shell having longitudinally and transversely extending bearing ribs on its curved face at its crown portion and provided with depending sides and said main shell having transverse recesses at its extreme ends having substantially upright but slightly flaring sides, of a removable soft metal lining shell having on its back marginal side and marginal end ribs and central projections or thickened portions, said marginal side ribs on said lining shell abutting against and being confined by said depending sides of the main shell, substantially as specified.

26. In a journal bearing, the combination with the main bearing metal shell having longitudinally and transversely extending bearing ribs on its curved face at its crown portion and provided with depending sides, and said main shell having transverse recesses at its extreme ends having substantially upright but slightly flaring sides, of a removable soft metal lining shell having on its back marginal side and marginal end ribs and central projections or thickened portions, said soft metal lining shell having also connecting ribs extending between said central thickened portions and said marginal side ribs, said marginal side ribs of said lining shell abutting against and being confined by said depending sides of the main shell, substantially as specified.

27. In a journal bearing, the combination with a main shell of hard, strong bearing metal having an upper key contact face and bearing ribs on its curved face at its crown portion extending in different directions and lying within its upper key contact face, said main shell being provided with depending longitudinal side walls having substantially upright but slightly flaring interior abutment faces, and said main shell having transverse recesses at its extreme ends and channels and cavities intermediate said side walls and bearing ribs, of a removable soft metal lining shell having marginal side and marginal end ribs and central thickened portions, substantially as specified.

28. In a journal bearing, the combination with a main shell of hard, strong bearing metal having an upper key contact face and bearing ribs on its curved face at its crown portion extending in different directions and lying within its upper key contact face, said main shell being provided with depending longitudinal side walls, having substantially upright but slightly flaring interior abutment faces, and said main shell having transverse recesses at its extreme ends and channels and cavities intermediate said side walls and bearing ribs, of a removable soft metal lining shell having marginal side and marginal end ribs and central thickened portions, and connecting ribs extending between said central thickened portions and said marginal side ribs, substantially as specified.

29. A journal bearing comprising in combination two separate and removable bearing metal shells, an outer one of hard, strong bearing metal and an inner one of soft bearing metal, said outer shell having narrow bearing ribs on its under face at its crown portion, said shells having at their outer longitudinal edges interfitting ribs and channels receiving said ribs for preventing the inner soft metal shell from displacement transversely under the rolling action of the journal, said outer shell having transversely extending channels at its extreme ends and said inner shell having transversely extending ribs at its extreme ends, substantially as specified.

30. A journal bearing comprising in combination two separate and removable bearing metal shells, an outer one of hard, strong bearing metal and an inner one of soft bearing metal, said outer shell having narrow bearing ribs on its under face at its crown portion, said shells having at their outer longitudinal edges interfitting ribs and channels receiving said ribs for preventing the inner soft metal shell from displacement transversely under the rolling action of the journal, and said shells having at their outer end edges interfitting ribs and channels receiving said ribs for preventing the inner soft metal shell from displacement longitudinally under end thrust of the journal collars, substantially as specified.

31. In a journal bearing, the combination with a main bearing metal shell, of an interfitting removable soft metal lining shell, said outer shell having narrow bearing ribs on its under face at its crown portion, said main shell having side walls embracing and confining the outer edges of the lining shell and transverse recesses at its extreme ends and said lining shell having at its recessed ends ribs embracing the outer ends of the main shell, substantially as specified.

WILLIAM H. MINER.
JOHN E. MUHLFELD.

Witnesses to signature of William H. Miner:
    H. M. MUNDAY,
    WILLIAM A. GEIGER.

Witnesses to signature of John E Muhlfeld:
    J. F. PEACH,
    T. E. HARVEY.